Patented June 21, 1932

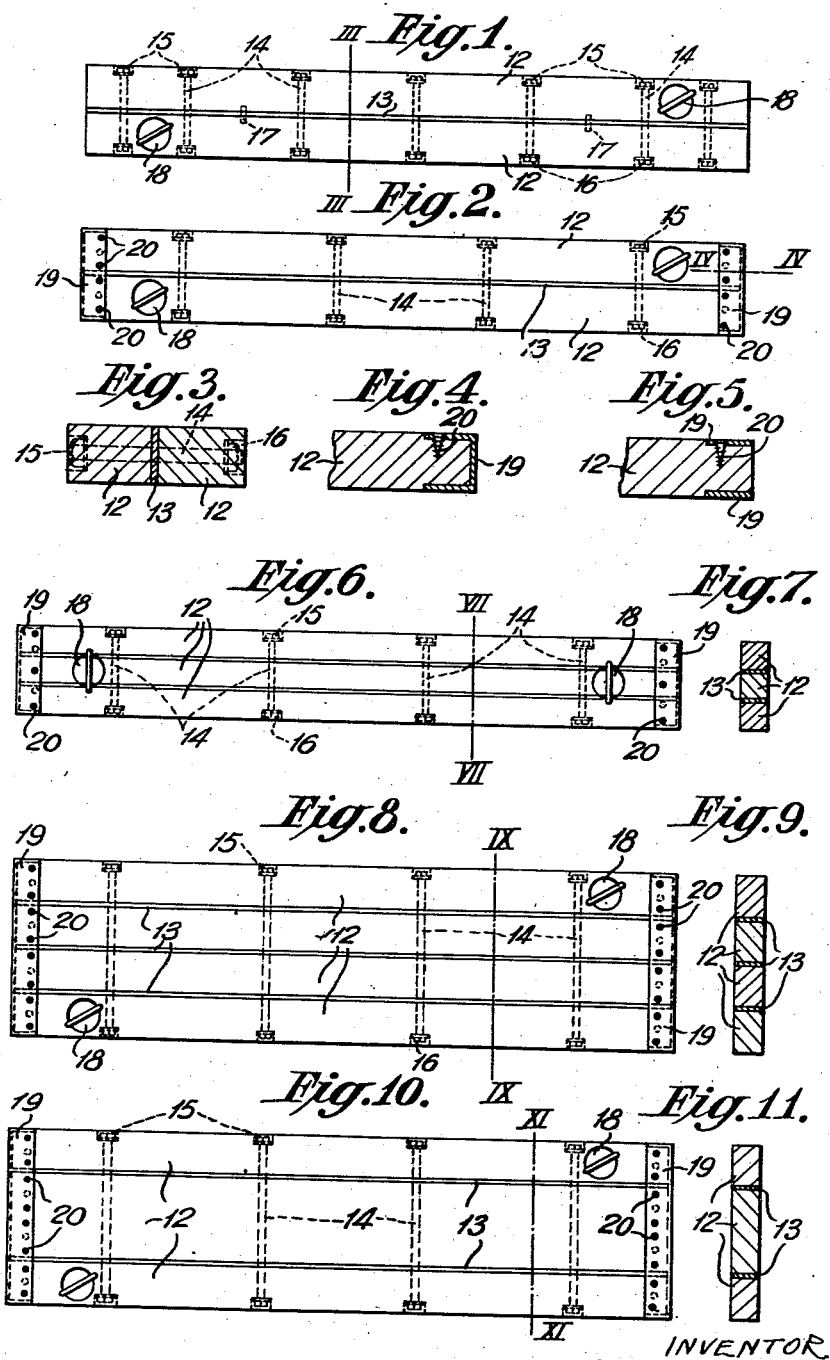

1,864,232

UNITED STATES PATENT OFFICE

HARRY COCKS, OF CARDIFF, WALES

SHIP'S HATCH COVER

Application filed January 9, 1931, Serial No. 507,700, and in Great Britain August 25, 1930.

This invention, which relates to ships' hatch covers, has for its object to provide a rigid and considerably stronger cover which eliminates the defects attending existing wooden covers. That is to say, the object of the present invention is to provide a cover which will not readily split, twist, contract or expand, or become distorted, and which will be weathertight and make for increased seaworthiness and safety of sea-going vessels, particularly in heavy weather.

It is well known that existing wooden covers suffer as regards the above defects, more especially as to warping, breakage and splitting at the weakest points, such as along the line of the hatchway bearing bars and recesses of the usual lifting handles, or down the seams in the case of a composite cover constituted by two or more sections united edge-to-edge, necessitating constant repairs and renewals.

According to this invention, a hatch cover unit is constituted by a single timber section or plank, or a combination of timber sections or planks reinforced by the introduction of suitably disposed reinforcing mediums. These reinforcing mediums may consist of a metal plate or plates or of metal of any suitable form or section or combination of plates and sections.

In the case of a hatch cover composed of a single timber section or plank, the reinforcing metal plates or sections may be disposed along the edges or ends.
In the case of a hatch cover composed of more than one timber section or plank, the metal plates or sections may be disposed between the joints of the several timber sections or planks and the reinforcing along the outside edges or ends as previously mentioned in the case of a single timber section or plank, may also be fitted or dispensed with as found most desirable.

The whole to be united by fastenings suitably disposed. The fastenings may consist of bolts fitted with nuts and washers, bolts clenched over at their ends or by screws or any other suitable means.
The timber sections or planks may be creosoted or treated with any suitable preservative preparation.

The reinforcing fitted to the ends of the hatch cover may, if desired, consist of box-shaped metal shoes so formed as to completely enclose the ends of the timber sections or planks, and arranged to lie flush with the upper and lower surfaces and the sides of the hatch cover. The shoes may be secured to the body of the cover by means of bolts, screws or other suitable means.

As an alternative to the box-shaped metal shoe, the end reinforcement may consist of an open-ended sleeve-like metal band. The box-shaped shoes or bands may be galvanized if desired.

It is to be understood that the shoes need not necessarily be provided.

In the particular arrangement of hatch covers shown in the drawing accompanying this specification, the reinforcement takes the form of vertically disposed plates. These plates may be of non-corrodible metal, galvanized metal, or metal treated with suitable anti-corrosive preparation. The size of the plates corresponds to the side edge superficial dimensions of the timber sections or planks, the upper and lower surfaces of the component parts of the cover being flush.

The principle of reinforcing embodied in this specification may be employed in the construction of a number of small units sufficient to cover a hatchway, or in the forming of units of larger sizes to cover larger sections of a hatchway, or of one single unit sufficient to cover a whole hatchway.

It is primarily intended for the reinforcement to be disposed longitudinally of the cover parallel to the side edges thereof, but it is to be understood that, as an alternative, the reinforcement may be transversely or diagonally disposed.

Embodiments of the invention are illustrated in the accompanying drawing, wherein:—

Figure 1 is a plan view of a "single" unit unprovided with end shoes.

Figure 2 is a plan view of a similar unit, but fitted with shoes.

Figure 3 is a sectional view on line III—

III in Figure 1, this cross-section being the same in the case of Figure 2.

Figure 4 is a fragmentary section on line IV—IV in Figure 2.

Figure 5 is a similar view to Figure 4 of a modified form of shoe that may be provided.

Figure 6 is a plan view of a modified "single" unit.

Figure 7 is a cross-section on line VII—VII in Figure 6.

Figure 8 is a plan view of a "double" unit.

Figure 9 is a cross-section on line IX—IX in Figure 8.

Figure 10 is a plan view of a modified "double" unit; and,

Figure 11 is a cross-section on line XI—XI in Figure 10.

Referring to the drawing, in each construction the hatch cover consists of a number of timber planks 12 disposed in co-planar or collateral fashion side-by-side, a vertically disposed metal reinforcement plate 13 being interposed at the joint or at each joint between adjacent timber planks, the superficial dimensions of said plate corresponding to the side edge dimensions of the timber planks with which it has contact. The timber planks with interposed reinforcement plate or plates are united together to form a solid whole by means of galvanized bolts 14 fitted with washers and nuts, said bolts being passed through transverse bores and having their heads 15 sunk into recesses in the outer edges of the timber planks, whilst the nuts 16 fitted thereon are also sunk into recesses, so that the bolts do not project beyond any surface. The reinforcement plate 13, or each such plate provided, is disposed with its edges coincident with the top and bottom surfaces of the planks, the latter also being flush with one another.

Dowel pins, indicated by reference 17 in Figure 1, may be employed in any of the constructions illustrated as a means for correctly locating the elements of the assembly.

Suitably disposed flush lifting handles 18 of the usual form are provided.

In the construction illustrated in Figure 1, the unit is left plain at the ends, whilst in the Figures 2, 6, 8 and 10, protective shoes 19 are fitted over the ends of the assembly, the external width and depth dimensions of said shoes corresponding to those of the assembled unit, the latter accordingly being reduced at its ends in order to fit into said shoes. Thus, the shoes preserve the flush formation of the cover surfaces.

As shown by Figure 4, the shoes 19 may have closed outer ends, or, as shown in Figure 5, their outer ends may be open so that in this latter case they are simply in the form of sleeves or bands encircling the plank and reinforcement components. The shoes are secured by means of screws 20 passing into the planks, the heads thereof being countersunk into the shoes.

It is to be understood that the invention is in no way limited to the number of plank and reinforcement units employed, as the number thereof may be varied as desired. Further, the reinforcement, instead of being in the form of a plate, could be constituted by any other desired reinforcement section.

I claim:—

1. A hatch cover comprising a plurality of timbers disposed in side by side relation, and bands disposed transversely across the ends of the outer side faces of the outermost timbers, said bands being countersunk into the timbers whereby the outer faces of the bands are disposed flush with the faces of the timbers across which the bands extend.

2. A hatch cover including a plurality of timbers arranged in side by side co-planar relation, metal plates arranged vertically between the adjacent faces of said timbers and having the edges thereof flush with the outer faces of the timbers, fastenings extending crosswise through said plates and timbers to hold the same assembled, and channel-shaped members fitted to the ends of said timbers and having the flanges thereof flush with the surfaces of the timbers.

In testimony whereof I have affixed my signature hereto this 17th day of December, 1930.

HARRY COCKS.